US 6,736,882 B2

(12) United States Patent
Kanazirev et al.

(10) Patent No.: US 6,736,882 B2
(45) Date of Patent: May 18, 2004

(54) LOW DUST ADSORBENTS AND CATALYSTS AND METHOD FOR PREPARATION

(75) Inventors: Vladislav I. Kanazirev, Arlington Heights, IL (US); Alan P. Cohen, Highland Park, IL (US); Peter Rumfola, III, Bueche, LA (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/228,115

(22) Filed: Aug. 26, 2002

(65) Prior Publication Data

US 2003/0134742 A1 Jul. 17, 2003

Related U.S. Application Data

(63) Continuation-in-part of application No. 09/796,218, filed on Feb. 28, 2001, now abandoned.

(51) Int. Cl.⁷ .......................... B01D 53/04; B01J 29/06
(52) U.S. Cl. ........................ 96/108; 502/63; 502/415
(58) Field of Search .................... 95/96–106, 117–126, 95/900; 96/108, 130, 143, 144, 147; 502/60, 63, 314, 415

(56) References Cited

U.S. PATENT DOCUMENTS

| | | | |
|---|---|---|---|
| 2,530,129 A | | 11/1950 | McAteer et al. |
| 2,915,365 A | | 12/1959 | Saussol |
| 3,430,418 A | | 3/1969 | Wagner .......................... 55/25 |
| 3,520,654 A | * | 7/1970 | Carr et al. .................. 423/628 |
| 3,840,477 A | | 10/1974 | Braithwaite et al. .... 252/455 R |
| 3,923,692 A | | 12/1975 | Braithwaite et al. .... 252/455 R |
| 3,986,849 A | | 10/1976 | Fuderer et al. ................. 55/25 |
| 4,144,074 A | | 3/1979 | Itoh et al. .................. 106/1.17 |
| 4,166,100 A | * | 8/1979 | Vorobiev et al. ............. 423/626 |
| 4,243,420 A | | 1/1981 | Sakai et al. ................. 106/38.3 |
| 4,378,308 A | * | 3/1983 | Angevine et al. .............. 502/63 |
| 4,414,005 A | * | 11/1983 | De Bievre et al. ............ 95/127 |
| 4,484,933 A | | 11/1984 | Cohen ........................... 55/25 |
| 4,701,438 A | * | 10/1987 | Taylor et al. ............... 502/405 |
| 5,110,327 A | | 5/1992 | Smith .......................... 55/163 |
| 5,206,004 A | * | 4/1993 | Park .......................... 423/700 |
| 5,210,063 A | * | 5/1993 | Chopin et al. .............. 502/415 |
| 5,607,500 A | | 3/1997 | Shamine et al. ............. 96/144 |
| 5,637,349 A | | 6/1997 | Cummins et al. ........... 427/212 |
| 5,744,420 A | * | 4/1998 | Le Loarer et al. .......... 502/415 |
| 5,759,949 A | * | 6/1998 | Grigorova et al. .......... 502/330 |
| 5,846,295 A | | 12/1998 | Kalbassi et al. .............. 95/105 |
| 5,856,265 A | * | 1/1999 | Kanazirev .................... 502/415 |
| 6,013,600 A | * | 1/2000 | Kanazirev .................... 502/415 |
| 6,022,821 A | * | 2/2000 | Singh et al. .................. 502/84 |
| 6,033,460 A | | 3/2000 | Snow .......................... 95/117 |
| 6,066,691 A | * | 5/2000 | Sobottka et al. ............. 524/450 |
| 6,100,211 A | * | 8/2000 | Kourtakis et al. ............ 502/64 |
| 6,159,898 A | * | 12/2000 | Kanazirev .................... 520/415 |
| 6,468,329 B2 | * | 10/2002 | Cho et al. ...................... 95/144 |
| 6,534,441 B1 | * | 3/2003 | Bartley et al. .............. 502/337 |

* cited by examiner

*Primary Examiner*—Robert H. Spitzer
(74) *Attorney, Agent, or Firm*—John G. Tolomei; Frank S. Molinaro; Mark Goldberg

(57) ABSTRACT

A method is provided for production of low dust adsorbents and catalysts. A thin layer of metal oxide derived from a colloidal solution of the oxide is deposited on the adsorbent or catalyst particle, which greatly improves the physical properties of the particle with regards to attrition and dust formation while retaining the adsorbent and catalytic properties of the particle. The method is applicable to a variety of porous refractory oxides. For example, treatment with colloidal silica improves greatly the physical stability of alumina adsorbents.

13 Claims, 1 Drawing Sheet

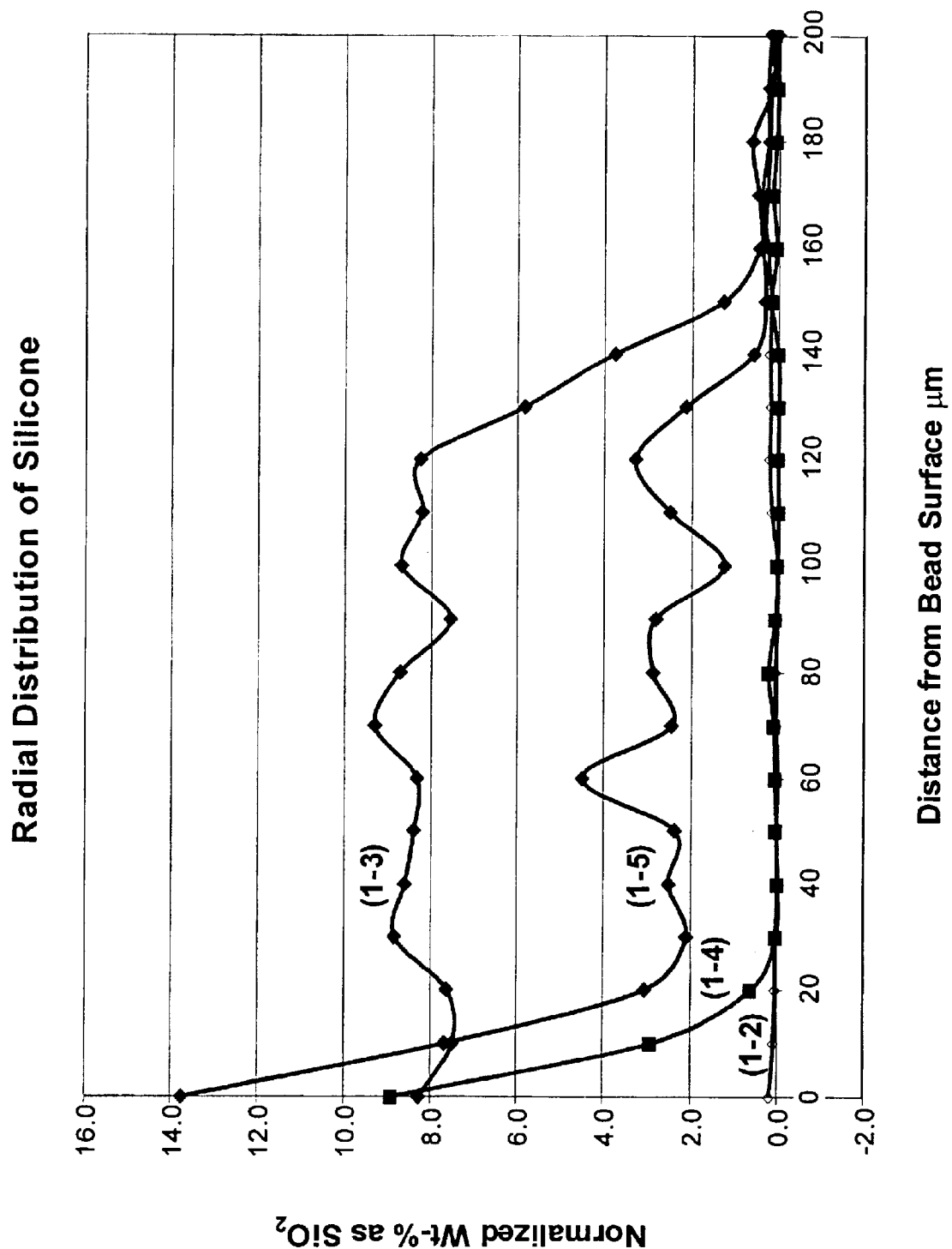

LOW DUST ADSORBENTS AND CATALYSTS AND METHOD FOR PREPARATION

CROSS-REFERENCE TO RELATED APPLICATION

This application is a continuation-in-part of application Ser. No. 09/796,218 filed Feb. 28, 2001, now abandoned.

FIELD OF THE INVENTION

The present invention relates, in general, to low dust adsorbents and catalysts and the method for their manufacture.

BACKGROUND OF THE INVENTION

A disadvantage to the use of industrial adsorbents and catalysts such as activated alumina and molecular sieves is their dustiness. Adsorbent and catalyst manufacturers and users need to reduce the level of dust and fine particles that are created in their manufacture and use in order to meet environmental and safety standards and also to meet process requirements. Dust and fine particles can interfere with the process of manufacture and use by plugging filters and valves, creating excessive pressure drops across the system and cause quality problems with products.

There are several factors that can cause a material to be dusty. Compaction of powders in the presence of liquids and additives by agglomeration and extrusion is the most popular production method for production of porous adsorbents and catalysts. Inevitably, some powder adheres to the outside surface of the final particle and can easily escape from it in the form of dust. Static charges can also cause dust accumulation on the particle surface. In addition, the unloading and packaging operation can generate dust by abrading any loosely bound particles at the granule periphery of a granule.

There are several different methods that can be applied to reduce the dustiness of solid materials that are most commonly present in the form of beads, granules or extrudates. Removal of dust and prevention of dust formation are the principal measures taken. Extensive screening in re-roll equipment, fluidizing and blowing with a gas flow are all common methods to cope with the dust problem. Washing followed by activation or further handling is another possible approach. For example, U.S. Pat. No. 5,637,349, which is hereby incorporated by reference, describes a system and a process for reducing the dust formation during the transfer of a particulate material on an endless conveyor belt. A wetting agent selected from the group consisting of water and organic surface active compounds is used to reduce the dusting.

Several different approaches can be applied to improve the attrition/abrasion resistance of the material and to diminish the intrinsic ability for dust formation. Among the disadvantages of the prior art methods are the danger of damaging the outside surface of the particulates by extensive rolling and screening, which can lead to damaging of the pores employed in adsorption and catalysis. There may be a need for additional thermal treatment or a change in the properties when washing is used as a dust removing technique. A material that has been treated to remove dust may still generate new dust upon subsequent packaging, transportation and unloading at the final destination.

There is a need for low cost, effective adsorbents for use in pressure swing adsorption air dryers, as well as in other applications. A suitable adsorbent must not only produce low dew points, but it must also have acceptable physical properties, such as low dust content and resistance to abrasion loss and attrition. Air brake drying represents a severe environment for the operation of a dryer due to the desiccant being subjected to vibration and due to the large pressure swings between the adsorption and desorption steps. In addition, the desiccant is exposed to hot compressed air, which may contain oil, and other volatile compounds such as hydrocarbons than can harm brake cylinders and related equipment. Adsorbents are sought which are more resistant to attrition and abrasion loss than conventional materials and which are effective in the removal of water and other contaminants from the compressed gas to produce dry compressed gases.

In a related U.S. patent application, Ser. No. 09/796,218 filed Feb. 28, 2001, it was disclosed that dust could be reduced by spraying cured, alumina balls, prior to activation with a silica coating. Surprisingly, it has now been found that the dust evolution from an adsorbent or catalyst can be greatly diminished by treatment with a small amount of colloidal silica on activated balls of alumina or on calcined balls of molecular sieve. In addition, it has been found that the process of the present invention can be applied to a wide variety of different materials without loss in performance, heat release or material damage. Furthermore, it was found that there was no need for heat treatment aside from brief drying after application of the coatings of the present invention. The improvement in lowered dustiness is combined with an enhanced resistance for dust formation in subsequent operations.

SUMMARY OF THE INVENTION

According to the present invention, activated shaped or pre-formed adsorbent or catalyst particles are modified by depositing a thin dispersed layer of a colloidal solution of a metal oxide such as silica, alumina, zirconia or combinations thereof on the external surface of the particles. The colloidal silica coating drastically reduces the abrasion loss and dusting. Surprisingly, this improvement is achieved without seriously reducing the performance of the adsorbent or catalyst particles.

Accordingly, in one embodiment, the present invention relates to a particle selected from the group consisting of adsorbents and catalysts wherein the particle comprises an adsorbent or a catalyst and wherein the particle is selected from the group consisting of porous refractory oxides such as alumina, silica, silica-alumina, zirconia, silica-zirconia, titania, magnesia and combinations thereof and zeolite and other types of molecular sieves. Dispersed on the particle is a metal oxide layer derived from colloidal solution in which at least 60 percent of the metal oxide is present in a band extending from the surface towards the center and having a width of less than 50 microns.

In another embodiment, the present invention relates to a method for producing a catalyst or an adsorbent comprising forming and activating a catalyst or an adsorbent particle; and coating the catalyst or adsorbent particle with a coating solution comprising colloidal metal oxide to provide a narrow layer of metal oxide dispersed thereon.

Additional objects, embodiments and details of this invention can be obtained from the following detailed description of the invention.

BRIEF DESCRIPTION OF THE FIGURE

The FIGURE shows a plot of $SiO_2$ in weight percent against the distance from the outer surface of the particles.

DETAILED DESCRIPTION OF THE INVENTION

The present invention has applicability in reduction of dust formation in the manufacture and use of adsorbents and catalysts. It is applicable to a broad range of materials including aluminas, as well as other porous refractory oxides and zeolites and other molecular sieves. The process of the invention is intended to be practiced on feed gas streams which comprise a feed gas and moisture or water; such feed gas streams include air, nitrogen, light hydrocarbons and mixtures thereof. The process of the invention can be also practiced on liquid streams, which are subjected to adsorption, or catalysis in processes where the reduction of suspended dust particles is important.

The process of the present invention is especially useful in gas drying applications such as in air brake systems for trucks or locomotives. It is also useful in other applications where operating conditions make it desirable for use of adsorbent particles having or generating a low level of dust. The gas in these systems (such as air) is often saturated with water following its compression to an operating pressure to activate the braking systems of the vehicle or piece of heavy equipment. If this water is not removed or significantly reduced, the braking systems will be subject to greater corrosion, or freezing, resulting in higher maintenance costs and reduced reliability. Generally, the feed gas stream employed to activate a braking system comprises air at water saturation conditions and a pressure above atmospheric pressure.

The term "pressure swing adsorption" as used herein generally relates to an adsorption process wherein an adsorber bed is part of an integrated process whereby a continuous adsorber operation can be obtained while simultaneously regenerating a spent adsorber bed. The first adsorber bed is depressurized in a countercurrent depressurization step wherein the pressure in the first adsorber bed is further reduced by withdrawing desorbed water vapor countercurrently to the direction of the feed. Finally the adsorber bed is purged with a purge gas such as dried product gas and repressurized. The final stage of repressurization is with the feed gas or the product gas in order to conserve the feed or the product gas.

In air brake drying systems, the process is simplified and generally there are no feed gas conservation steps. Pressure swing adsorption in air brake drying is generally carried out in a single adsorbent bed with essentially two process steps. In some severe service situations, for example, in locomotives, pressure swing adsorption air brake systems are provided with two adsorption beds which alternate between the adsorption and desorption strokes to provide a continuous supply of dry air. An example of an air brake dryer containing a desiccant is disclosed in U.S. Pat. No. 5,607,500, which is hereby incorporated by reference.

The alumina adsorbents of the present invention are prepared by treating shaped alumina particles with colloidal silica after activation. The activated alumina referred to includes alumina having a BET surface area usually greater than 100 $m^2/g$ and typically in the range of 100 to 550 $m^2/g$ and preferably in the range of 250 to 400 $m^2/g$. The shaped alumina particles are prepared in most cases by agglomeration of activated alumina powder that is preferably obtained by rapid dehydration of aluminum hydroxides, e.g., alumina trihydrate or hydrargillite, which is also known also as gibbsite, in a stream of hot gases. Dehydration may be accomplished in any suitable apparatus using the stream of hot gases. Generally, the time for heating or contacting with the hot gases is a very short period of time, typically from a fraction of a second to 4 or 5 seconds, for example. Normally, the temperature of the gases varies between 400° and 1000° C. The process is commonly referred to as flash calcination and is disclosed in U.S. Pat. No. 2,915,365 incorporated herein by reference. However, other methods of calcination may be employed to dehydrate or partially dehydrate the trihydrate.

The source of activated alumina powder is usually gibbsite, which is one form of alumina hydrate derived from bauxite using the Bayer process. Other sources of alumina may also be utilized including clays and aluminum alkoxides. Also, alumina gel may be a source of the alumina. The shaped or pre-formed alumina particles are agglomerates having an average pore diameter less than about 3.5 nm (35 angstroms). The total pore volume of the agglomerates can usually vary from about 0.2 to more than 1 cc/g which includes in most of the cases a substantial macroporosity. By definition, the macroporosity consists in pores larger than 50 nm. while the terms meso and micro pores refers to pores between 2 and 50 nm and under 2 nm, respectively.

The agglomerates may be formed into spheres, pills, extrudates, flakes, monoliths and the like. Agglomerates formed in this manner generally comprise alumina particles having an average particle size of about 9,000 to 10,000 mn (0.9–10 millimeters). The total BET surface area of a typical alumina desiccant is typically about 350 $m^2/g$, while the surface area of the external surface of the alumina particle is only about 12 $m^2/g$. The external surface is defined here as a surface enclosed in pores which would be accessible for particles as large as 8 nm, which is a typical size of the colloidal particles. One adsorbent of the present invention comprises alumina particles having colloidal silica disposed on the external surface of the alumina particles without obstructing the remaining interior surface area within the porous alumina particle. This phenomenon was confirmed by scanning electron microscopy and energy dispersive X-ray analysis (SEM-EDS). When the shaped alumina particles which range in size from about 1.0 to about 3.0 mm are treated with colloidal silica, the silica is disposed in a narrow layer or band concentrated near the surface of the shaped alumina particle. Surprisingly, this narrow band of silica does not interfere with the adsorption properties of the shaped or pre-formed alumina particle, and actually improves the physical properties of the adsorbent including attrition loss and abrasion.

Generally, particulates of a porous refractory oxide can be manufactured by a variety of methods such as extrusion, crushing of a solid mass, agglomeration in presence of binders, spray drying, pressing pellets from powders and others. The process of preparing particulate material and the finishing operations such as thermal activation often generate dust. Hence, the treatment of the final material with a colloidal solution of a metal oxide such as silica is considered in this invention as a final operation, besides optional brief drying, in the manufacturing of adsorbents and catalysts. In addition, a commercially available adsorbent or catalyst can be treated with a colloidal solution in order to reduce the dust formation in the process of its further handling and use.

The colloidal metal oxide could be applied to the pre-formed porous refractory oxide particle by spraying, soaking or any other conventional means. It is preferred to apply the colloidal solution by using a coating technology in any convenient way. Both batch and continuous coating technologies are feasible. For example, the particulate could be placed in a rotating vessel and rotated for a given time while sprayed with the colloidal solution and then discharged. Alternatively, a steady flow of the material could be attained on a vibrating endless belt or rotating drum while the spraying solution is delivered continuously. Generally, the coating operation does not require application of external heating. A slight elevation of the particulate temperature is usually observed upon contact with the colloidal solution.

The finished material after applying the colloidal metal oxide solution does not need any additional treatment to be used in cyclic processes of drying or other applications where the initial thermal treatment is a part of the process. Only a brief drying of the particulate material may be needed in application where high dryness of the solid adsorbent or catalyst is required.

Colloidal silica coatings have been applied to alumina particles previously employing a significantly different process. In U.S. Pat. No. 3,840,477, catalysts are produced by a process of combining alumina, silica, activating agent and applying high temperatures. The product produced in the patent comprises a reaction product that has significant changes from the alumina starting material. The products prepared in accordance with the present invention have a silica coating but do not have changes to the chemical properties of the particles by application of this coating where there is no reaction product produced as was in the '477 patent.

A colloid is defined as consisting of small particles which are in a suspension which fail to settle out and diffract a beam of light. The term "colloidal silica" means silica particles ranging in average diameter from greater than about 2 nm to less than about 500 nm. Preferably, the average diameter of the colloidal silica particles ranges from about 4 nm to about 200 nm, and most preferably the average diameter of the colloidal silica particles ranges from about 4 nm to about 10 nm. Particularly advantageous results were achieved with colloidal silica particles having an average diameter of about 4 nm. After application, the colloidal silica comprises 0.5 to 3 percent of the particle weight, preferably 1 to 2 percent and most preferably about 1.5 to 2 percent by weight. A preferred colloidal silica solution comprises colloidal silica in an aqueous solution. The colloidal silica solution can comprise other ions selected from the group consisting of sodium ions, hydrogen ions, chloride ions, and the like. In the present invention, the colloidal silica does not penetrate the entire particle, but remains within a thin layer near the surface of the pre-formed alumina particle. On the other hand, silicate treating; that is, treating with soluble silica, results in silica dispersed beyond the surface toward the center of the pre-formed alumina particle. Such silicate treated materials do not show the improved physical properties such as attrition loss and abrasion of the adsorbent of the present invention.

One of the problems of coating silica on pre-formed particles of alumina is keeping the coating on the alumina particle. This ability of the coating to remain on the particle is measured by attrition loss and by abrasion loss. Attrition loss is a physical property of the pre-formed alumina particle, which is measured by rubbing or grinding the particles together and measuring the loss during the grinding process. Accordingly, a sample of the material is rotated for a set period of time in a cylindrical drum having a single baffle. Any fines produced during the test are determined and considered to be a measure of the propensity of the material to produce fines in the course of transportation, handling and use. Typically, 100 g of material are rotated for 1800 revolutions at a rate of about 60 revolutions per minute. The colloidal silica coated alumina particles of the present invention surprisingly showed a significant reduction in attrition loss relative to untreated and silicate treated alumina particles. The attrition loss after colloidal silica treatment was less than 0.5 wt-% and more particularly the attrition loss of the colloidal silica treated alumina was less than 0.2 wt-%. This represents a 400% improvement over conventionally silicate treated and untreated alumina.

Abrasion loss is measured by placing a weighed sample of material on a screen and tapping the screen for about 30 minutes while catching any dust produced. The amount of dust produced is determined and expressed as a weight percent loss. Abrasion loss for the colloidal silica treated alumina particles showed significant improvement over conventional silica treated and untreated aluminas. The abrasion loss for colloidal silica treated alumina particles was less than 0.5 wt-%, and often less than 0.05 wt-%.

The colloidal metal oxide solution can be applied prior to activation of the porous refractory oxides and calcination of zeolites, but it has been found to be a much simpler process to apply the colloidal solution to the activated or calcined particles.

EXAMPLES

The following examples are provided to illustrate the process of the present invention and are not intended to limit the scope of the claims that follow. The examples are based on laboratory data of adsorption characteristics of various desiccants or on process engineering design calculations and adsorption relationships as noted. Some of the examples presented below are experiments done with unactivated, pre-formed alumina particles as described hereinabove. They are formed in a conventional manner by agglomerating flash calcined alumina as described hereinabove.

Example 1

Spray Treatment

About 1000 g of unactivated, pre-formed alumina particles of 2.4 to 4 mm in diameter (size 5×8 mesh Tyler screen series) were treated in a 0.3 meter (12-inch) laboratory rotating drum and sprayed by hand with the following solutions. The method used was to spray the pre-formed alumina particles for 3–5 minutes with 70–80 cc of the silica solution followed by about 5-minute further rotation. The alumina particles were then tray activated for 1 hour at 400° C. (750° F.) in a Grieve oven and analyzed for attrition according to the American Society for Testing and Measurement (ASTM) test designation D 4058-87. Abrasion was also measured to determine the abrasion loss of activated alumina wherein a 165 g sample is placed on a 595 micron (28 mesh Tyler) screen and the screen is tapped for 30 minutes. Abrasion loss is the weight percent of sample lost through the screen.

TABLE 1

| Sample | Treatment Solution | Approx. $SiO_2$ content (VFB*) | Abrasion Loss, SPM 202B, wt-% | Attrition, ASTM D4058-87, wt-% |
|---|---|---|---|---|
| 1-1 | None | 0 | 0.66 | 0.85 |
| 1-2 | Water | 0 | 0.62 | 0.77 |
| 1-3 | $Na_2SiO_3$ | 2.2 | 1.03 | 0.89 |
| 1-4 | Ludox ® Cl | 2.1 | 0.048 | 0.10 |
| 1-5 | Ludox ® SM | 1.8 | 0.04 | 0.21 |

*volatile free basis

Ludox® Cl (DuPont Corp. identified as Ludox® CL) is a colloidal silica coated with alumina and containing chloride as an ion. The Ludox® CL has a total content of $SiO_2$ and $Al_2O_3$ of about 30 wt-%, and a pH of 4.6. Ludox® SM (DuPont Corp. identified as Ludox® SM-30) is sodium-stabilized 30 wt-% colloidal silica, with a pH of 10.5. The spraying solution for samples (1-4) and (1-5) was prepared by diluting the original Ludox® reagent with an equal mass of water. A weight of 92.7 g of diluted Ludox® Cl solution was sprayed over 1000 g pre-formed alumina particles to make sample (1-4), and 78.6 g of diluted Ludox® SM was sprayed over 1000 g of pre-formed alumina particles to make sample (1–5).

Sodium metasilicate $Na_2SiO_3 \cdot 5\ H_2O$ is a technical grade reagent available from Alfa Aesar. Forty grams of the granular product was dissolved in 100 g water. The pre-formed particles (1000 g) were sprayed with 108 g of sodium metasilicate solution to make sample (1-3).

The abrasion loss for the water treated control sample (1-2) is practically the same as the untreated particles of sample (1-1). The abrasion loss of the alumina particles treated with both forms of colloidal silica samples (1-4) and (1-5) are improved by more than one order of magnitude, while the abrasion loss with the sodium silicate sample (1-3) actually became worse, indicating that the silicate coating may be contributing to the abrasion loss. The samples treated with colloidal silica were significantly reduced in attrition loss under the ASTM test of 1800 revolutions of the test drum.

In Example 1, the treatment with colloidal silica has apparently produced a narrow layer of silica around the alumina particle that protects the outer surface from loss of material by attrition and abrasion. It is surprising that sodium silicate is distributed more evenly through the alumina core and is ineffective in producing an outer layer with the associated benefits.

Example 2
Stability Towards Rehydration of Activated Alumina Particles

The pre-formed alumina particles produced in Example 1 were activated at 400° C. (750° F.) in an oven. Then 70 g of activated particles were added to 90 g deionized water and stored at room temperature for a prolonged period of time. Small samples were withdrawn and analyzed by TGA (thermal gravimetric analysis) using a Perkin Elmer apparatus to determine the degree of rehydration. Typically, about 10 mg powdered sample was heated in a He flow from 25° to 700° C. at a rate of 25° C./min. The specific weight loss between about 220° and about 320° C. was then measured and compared to the weight loss of a pure aluminum hydroxide standard (Bayerite alumina phase). The results in Table 2 show the relative weight loss expressed in percent of the weight loss of the Bayerite standard.

TABLE 2

Rehydration Stability, % hydroxide formed

| Sample | Rehydration after 24 h | Rehydration after 90 h | Rehydration after 240 h |
|---|---|---|---|
| 1-1 | 5.1 | 9.7 | 15.0 |
| 1-2 | 4.0 | 9.5 | 14.2 |
| 1-3 | 5.5 | 8.5 | 12.0 |
| 1-4 | 3.3 | 7.6 | 12.6 |
| 1-5 | 4.2 | 8.8 | 12.4 |

The data on the activated particles in Table 2 shows that all the silica-coating materials, including sodium silicate and both colloidal silicas, reduced the rehydration tendency of alumina. After 240 hours in water, the untreated (1-1) and water-treated (1-2) lost more than 14 wt-% of the alumina to rehydration, but the silica-treated particles lost only 12 wt-%, an improvement of about 15% after 240 hours, which is unexpected. The expected result would have been that only the $SiO_2$-coated portion of the coated pre-formed alumina particle would resist re-hydration. The expected improvement in re-hydration would be just about 3.5 wt-% for the 20-micron penetration of $SiO_2$ into the particle observed in Example 5 below.

Example 3
BET Surface Area

The pre-formed alumina particles treated in Example 1 and activated at 399° C. (750° F.) were tested for BET surface area. The results, given in Table 3, show that the surface area was retained in spite of the silica coating. This shows that the coating did not form an impermeable envelope around the pre-formed alumina particles.

TABLE 3

| Sample | Treatment Solution | Approx. $SiO_2$ content (VFB*) | BET Surface Area, $m^2/g$ |
|---|---|---|---|
| 1-2 | Water | 0 | 359 |
| 1-3 | $Na_2SiO_3$ | 2.2 | (not measured) |
| 1-4 | Ludox ® Cl | 2.1 | 356 |
| 1-5 | Ludox ® SM | 1.8 | 366 |

*volatile free basis

Example 4
Location of Silica Species

The location of the silicate species in the treated particles of Example 1 was investigated by SEM-EDS scanning electron microscopy and the silica content was determined within a particle by energy dispersive analysis by X-rays. Measurements were made across the interior of the particle to determine the silica distribution of sectioned particles of about 3.5 mm in diameter. The presence of silica as $SiO_2$ in weight percent was plotted against the distance from the outer surface of the particles in the FIGURE. The nomenclature here is the same as in Example 1. These data show that a colloidal silica layer was formed on the outer surface by the treatment with colloidal silicas. The Ludox® Cl produced a silica layer that penetrated only about 20 microns into the particle. The Ludox® SM deposited more $SiO_2$ on the outside, and its concentration also trailed off at about 20 microns, but a small amount penetrated farther into the particle to about 140 microns. The sodium silicate was more evenly distributed in the outer 140 microns of the particle.

Example 5
Soaking vs. Spraying Colloidal Silica

In another preparation, a sodium stabilized colloidal silica solution (30% silica) (available from Nalco Chemical as Nalco® 1130) was applied to 3.5 to 6.7 mm (3×6 mesh) pre-formed alumina particles by spraying and soaking. The amount of colloidal silica applied is shown in Table 4 below:

TABLE 4

| Sample | Treatment Solution | Treatment Method | Silica Added, wt-% (VFB*) | Abrasion Loss, SPM 202B, wt-% |
|---|---|---|---|---|
| 6-1 | Water | Soak | 0 | 0.35 |
| 6-2 | Nalco ® 1130 | Soak | 0.8 | 0.17 |
| 6-3 | Water | Spray | 0 | 1.33 |

TABLE 4-continued

| Sample | Treatment Solution | Treatment Method | Silica Added, wt-% (VFB*) | Abrasion Loss, SPM 202B, wt-% |
|---|---|---|---|---|
| 6-4 | Nalco ® 1130 | Spray | 2.2 | 0.15 |

*volatile free basis

Sample (6-3) was prepared by spraying 900 g of pre-formed alumina particles with 78.7 g water. Sample (6-4) was prepared by spraying 900 g of pre-formed alumina particles with 62.1 g diluted Nalco® colloidal silica solution. The diluted colloidal silica solution was prepared by mixing Nalco® 1130 with an equal mass of deionized water. The soaking was done with water (1000 g pre-formed alumina particles with 500 g water for sample (6-1)) and colloidal silica (800 g pre-formed alumina particles with 400 g liquid consisting of 50 g undiluted Nalco® 1130, 30% colloidal silica solution and 350 g water for sample (6-2)). In both cases, the soaking solution just covered the pre-formed alumina particles placed in a beaker. After allowing the pre-formed alumina particles to stand without stirring for about 25 minutes, the liquid was decanted. Both the sprayed and soaked pre-formed alumina particles were further de-watered by being spread over a screen tray and immediately activated at 400° C. (750° F.) for one hour. The results show that merely soaking in water is effective in reducing abrasion loss, compared to spraying with water. However, spraying or soaking with colloidal silica are significantly more effective in reducing abrasion loss by more than 200% over treatment with water.

Example 6
Turbidity Dust Test Method (General Method Used)

The dustiness of adsorbent samples was measured by an aqueous turbidity method. The adsorbent sample (10.0 grams of dry adsorbent or the equivalent of 10.0 grams dry) was poured into a 500-mL beaker containing 125 mL distilled water. The beaker was swirled for less than 5 seconds and the water and suspended dust were poured off into a flask leaving the adsorbent beads in the beaker. The adsorbent beads were washed three more times with 125 mL of distilled water, each time swirling less than 5 seconds, and pouring the water and suspended solids into the same flask. A total of 500 mL of water with suspended solids was thus obtained. The water and suspended solids were mixed by swirling, and the turbidity of the mixture was measured using a Hach 2100 AN-IS turbidimeter, available from Hach Company. The turbidity was the scattered light expressed in NTU (nephelometer turbidity units).

Example 7

A sample of 7×12 mesh alumina was used. About 50 g alumina beads were loaded in a 5-inch cylindrical container and rotated at about 80 rpm while adding a liquid consisting of 44 mass-% NALCO™ 1130 colloidal silica solution and 56% water. The liquid was added in small portions by hand spraying. At least 10 liquid portions were delivered in each preparation within a total time of approximately 4 minutes. The final sample in each case was stored in a closed container. The turbidity measurements were performed on each sample to evaluate the dust formation.

Table 5 presents the results for two series of samples. The first one consists of samples, which were sprayed with colloidal silica solution without any thermal activation. LOI (loss on ignition) measurements at 315° C. showed that the source sample for this set of experiments contained about 7.2% moisture.

The second set of samples on the bottom part of Table 5 were first activated for 1 hour at 315° C., then cooled down to room temperature in a moisture-free environment and finally treated with the colloidal silica solution as described above.

The results in Table 6 show that the improvement of the dustiness depend on the amount of the solution added regardless of the moisture content of the source sample. The dustiness of the source sample without any treatment was measured as about 32 NTU by the turbidity method.

TABLE 5

| Sample | Thermal Treatment | LOI - 315° C. Mass-% | Weight Charged, g | Solution Added, g | SiO$_2$ Loading, g/100 g Sample | Turbidity, NTU |
|---|---|---|---|---|---|---|
| 8-1 | None | 7.25 | 53.9 | 1.48 | 0.39 | 23.8 |
| 8-2 | None | 7.25 | 53.9 | 2.5 | 0.66 | 19 |
| 8-3 | None | 7.25 | 53.9 | 3.04 | 0.80 | 14 |
| 8-4 | None | 7.25 | 53.9 | 4.02 | 1.06 | 9.4 |
| 8-5 | None | 7.25 | 53.9 | 4.94 | 1.30 | 8.3 |
| 8-6 | None | 7.25 | 53.9 | 6.07 | 1.60 | 5 |
| 8-7 | 315° C. | 0 | 50 | 1.54 | 0.41 | 24 |
| 8-8 | 315° C. | 0 | 50 | 2.54 | 0.67 | 18.9 |
| 8-9 | 315° C. | 0 | 50 | 3.04 | 0.80 | 14.3 |
| 8-10 | 315° C. | 0 | 50 | 4.01 | 1.06 | 13.8 |
| 8-11 | 315° C. | 0 | 50 | 5.06 | 1.34 | 7.9 |

Example 8

A sample of 9×16 mesh alumina was used in Example 8. This sample had about 4.1 loss on ignition (LOI—315° C.) as determined by thermal treatment for 1 hour at 315° C. Five batches of this sample were treated with colloidal silica solution prepared as described in Example 7.

TABLE 6

| Sample | Alumina, g | Si Solution, g | Produced Activated, g | SiO$_2$ Loading, g/100 g Sample | Turbidity, NTU |
|---|---|---|---|---|---|
| 9-1 | 1042.5 | 63.3 | 977.4 | 0.85 | 9.1 |
| 9-2 | 1042.5 | 60.8 | 978.1 | 0.82 | 9.5 |
| 9-3 | 1042.6 | 60 | 980.3 | 0.81 | 8.4 |
| 9-4 | 1042.6 | 61.9 | 975.8 | 0.84 | 9 |
| 9-5 | 1042.5 | 61.7 | 977.9 | 0.83 | 8.5 |
| 9-6 | N/A | N/A | N/A | 0.00 | 23.8 |

The treatment with the colloidal silica solution was carried out in a larger rotating tub (capable of handling more than 1000 g of beads. The tub was about 31 cm (1 foot) in diameter and rotated at about 55 rpm at an angle of about 45 degrees). The solution was delivered by spraying discrete portions (about 1 g each) of the above solution over the rotating alumina beads. A total of 60–70 portions were delivered in each case. All samples were subsequently activated at about 400° C.

Table 6 shows that the repeatability of the procedure is good. All samples have an improved dustiness compared to the non-treated sample.

Example 9

A sample of a 7×12 mesh activated alumina was used. This sample had about 7.5 loss on ignition (LOI—315° C.) as determined by thermal treatment for 1 hour at 315° C. Five batches of this sample were treated with colloidal silica solution prepared as described in Example 8. One sample (10-6) was treated with just water at the same conditions. All samples were spread on trays and activated at 400° C. in an air purged oven for about one hour.

Table 7 shows that the treatment with the colloidal silica strongly improves the dustiness. Both the non-treated sample and the sample tumbled in the presence of water, instead of colloidal silica solution, show much higher turbidity.

TABLE 7

| Sample | Alumina, g | Si Solution, g | Water, g | SiO$_2$ Loading, Mass % | Turbidity, NTU |
|---|---|---|---|---|---|
| 10-1 | 1082 | 61.5 | 0 | 0.81 | 7.2 |
| 10-2 | 1082 | 61.5 | 0 | 0.81 | 6.0 |
| 10-3 | 1082 | 64.3 | 0 | 0.85 | 6.0 |
| 10-4 | 1082 | 60 | 0 | 0.79 | 5.2 |
| 10-5 | 1082 | 61 | 0 | 0.81 | 6.4 |
| 10-6 | 1082 | 0 | 60.8 | 0.00 | 29.3 |

Example 10

A commercial 3A molecular sieve produced by UOP 8×14 mesh beads was used in this example. The treatment with a colloidal silica solution was performed as described in Example 7. The results are summarized in Table 8. It was concluded that the silica coating is effective in reducing dust of molecular sieve beads.

TABLE 8

| Sample | Treatment | LOI - 315° C., Mass % | Weight Charged | Solution Added, g | SiO$_2$ Loading, g/100 g Sample | Turbidity, NTU |
|---|---|---|---|---|---|---|
| 11-1 | None | 1.04 | N/A | N/A | 0.00 | 9.4 |
| 11-2 | Yes | 1.04 | 50.53 | 1.53 | 0.40 | 8.8 |
| 11-3 | Yes | 1.04 | 50.53 | 4.05 | 1.07 | 3.4 |

Example 11

A sample of NORIT® granulated activated carbon sized to 8×14 mesh was sprayed with water and colloidal silica solution at the conditions described in Example 10. The subsequent turbidity measurements listed in Table 9 show no difference between the non-treated sample of one side and the samples treated with just water and colloidal silica solution, on another. Hence, we deduced that the claimed method of dust reduction is not applicable to activated carbon.

TABLE 9

| Sample | Treatment | Weight Charged | Solution Added, g | SiO$_2$ Loading, g/100 g Sample | Turbidity, NTU |
|---|---|---|---|---|---|
| 12-1 | None | N/A | N/A | 0.00 | 7.4 |
| 12-2 | Water | 50.00 | 5.2 | 0.00 | 6.6 |
| 12-3 | Yes | 50.00 | 5.0 | 1.30 | 6.8 |

Example 12

The samples were tested for drying capacity using the method of SAE (Society of Automotive Engineers) Standard J2384. A fixed volume of 1.2 liters of adsorbent was loaded into a refillable dryer cartridge designed to simulate the spin-on dryers of Bosch, Wabco, Bendix, and others. The cartridge was installed on a Wabco dryer base. In accordance with J2384, compressed air flowed through the system at 12 SCFM, saturated with water vapor at a temperature of 71° C. (160° F.) and a pressure of 883 kPa (128 psia). An external purge volume of 6 liters was provided. The adsorption cycle time was varied between 15 and 55 seconds in increments of 5 seconds. The dew point of the dried gas was monitored with a Panametrics Series 1 hygrometer. At each adsorption time, enough adsorption-desorption cycles were run for the dew point to line out. By interpolation, the adsorption time at which the system produced a dew point of 5° C. (41° F.) was found, and the net amount of gas dried per cycle (flow times adsorption-time minus purge gas) was calculated as the drying capacity. The results shown in Table 10 are the drying capacity of the silica-coated alumina adsorbent.

TABLE 10

Drying Capacity According to SAE J2384

| Sample | Size (Tyler) | Silica Loading (wt-%)* | Capacity (SCF/Cycle) |
|---|---|---|---|
| 13-1 | 7 × 12 | 0.8 | 9.1 |
| 13-2 | 7 × 12 | 0.8 | 9.3 |
| 13-3 | 9 × 16 | 0.8 | 10.0 |

*Calculated from the material balance

Example 13

A sample of 7×12 Tyler mesh activated alumina beads was used. This sample had about 1.8 mass % loss on ignition (LOI—315° C.) as determined by thermal treatment for 1 hour at 315° C. The sample was treated at the conditions described in Example 8 with different amounts of colloidal silica solution Nalco® 1115 solution. The dustiness of the samples was evaluated by turbidity measurements without any additional thermal treatment. Table 11 shows that the treatment with Nalco® 1115 results in a very strong improvement in regard to dustiness. Table 11 also shows that the samples tumbled in absence of colloidal silica solution show much higher turbidity.

TABLE 11

| Sample | Treatment | Weight Charged | Solution Added, g | SiO$_2$ Loading, g/100 g Sample | Turbidity, NTU |
|---|---|---|---|---|---|
| 14-1 | Rolling | 1000 | 0.0 | 0.00 | 17.5 |
| 14-2 | Water | 1000 | 80 | 0.00 | 17.8 |
| 14-3 | Nalco ® 1115 | 1000.3 | 65.4 | 1.0 | 5.6 |
| 14-4 | Nalco ® 1115 | 1000.4 | 78.4 | 1.2 | 4.1 |
| 14-5 | Nalco ® 1115 | 1000.2 | 91.5 | 1.4 | 2.5 |
| 14-6 | Nalco ® 1115 | 1000 | 104.5 | 1.6 | 2.0 |
| 14-7 | Nalco ® 1115 | 1000.4 | 117.6 | 1.8 | 3.3 |
| 14-8 | Nalco ® 1115 | 1000.5 | 130.7 | 2.0 | 1.5 |

What is claimed is:

1. A particle selected from the group consisting of adsorbents and catalysts wherein said particle comprises an adsorbent or a catalyst and an outer layer comprising a metal oxide layer wherein said particle is selected from the group consisting of porous refractory oxides and molecular sieves wherein said refractory oxides are selected from the group consisting of aluminas, silica, silica-alumina, zirconia, silica-zirconia, titania, magnesia and combinations thereof, and wherein said particles have a surface area between about 250 and 400 m$^2$/g, wherein said metal oxide layer is derived from a colloidal solution comprising silica wherein at least 60 percent of the said metal oxide is present in a band extending from the surface towards the center and having a width of less than 50 microns wherein said silica in said colloidal solution comprises silica particles having an average diameter of about 4 to 10 nm and wherein said adsorbents and catalysts are activated prior to application of said colloidal metal oxide solution.

2. The particle of claim 1 wherein about 0.5 to 3 percent of said particle comprises said metal oxide.

3. The particle of claim 1 wherein about 1 to 2 percent of said particle comprises said metal oxide.

4. The particle of claim 1 wherein about 1.5 to 2.0 percent of said particle comprises said metal oxide.

5. The particle of claim 1 wherein said aluminas are selected from the group consisting of alumina and aluminum silicates.

6. The particle of claim 1 wherein the band of metal oxide extending from the surface towards the center has a width of less than about 20 microns.

7. The particle of claim 1 wherein the particle has an attrition loss of less than 0.5 wt-%.

8. The particle of claim 1 wherein said metal oxide is silica.

9. A method for producing a catalyst or an adsorbent comprising:

a) forming and activating a catalyst or an adsorbent particle having a surface area between about 250 and 400 m$^2$/g; and then b) coating said catalyst or adsorbent particle with a coating solution comprising colloidal metal oxide to provide a narrow layer of colloidal metal oxide dispersed thereon wherein said colloidal metal oxide comprises silica particles having an average diameter of about 4 to 10 nm.

10. The method of claim 9 wherein the coating solution further comprises an ion selected from the group consisting of sodium, chloride and hydrogen.

11. The method of claim 9 wherein said coating solution is applied by a spraying means.

12. The method of claim 9 wherein said catalyst or adsorbent is selected from the group consisting of porous refractory oxides and molecular sieves.

13. The method of claim 12 wherein said refractory oxides are selected from the group consisting of aluminas, silica, silica-alumina, zircoriia, silica-zirconia, titania, magnesia and combinations thereof.

* * * * *